Figure 1:
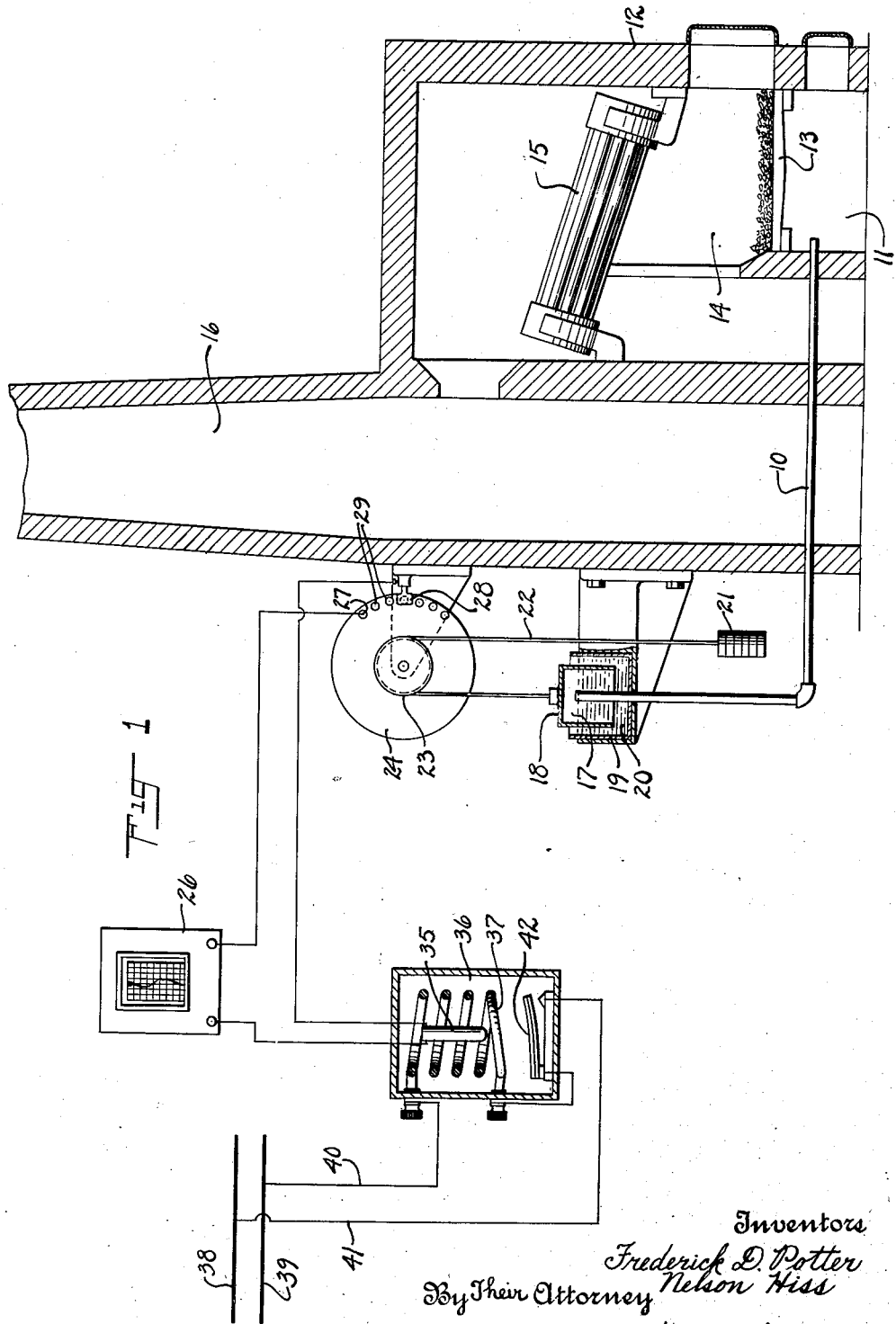

June 4, 1929.   F. D. POTTER ET AL   1,715,511
INDICATING OR RECORDING APPARATUS
Filed March 18, 1921   2 Sheets-Sheet 1

Inventors
Frederick D. Potter
Nelson Hiss
By Their Attorney H. H. Dyke

June 4, 1929.   F. D. POTTER ET AL   1,715,511
INDICATING OR RECORDING APPARATUS
Filed March 18, 1921   2 Sheets-Sheet 2
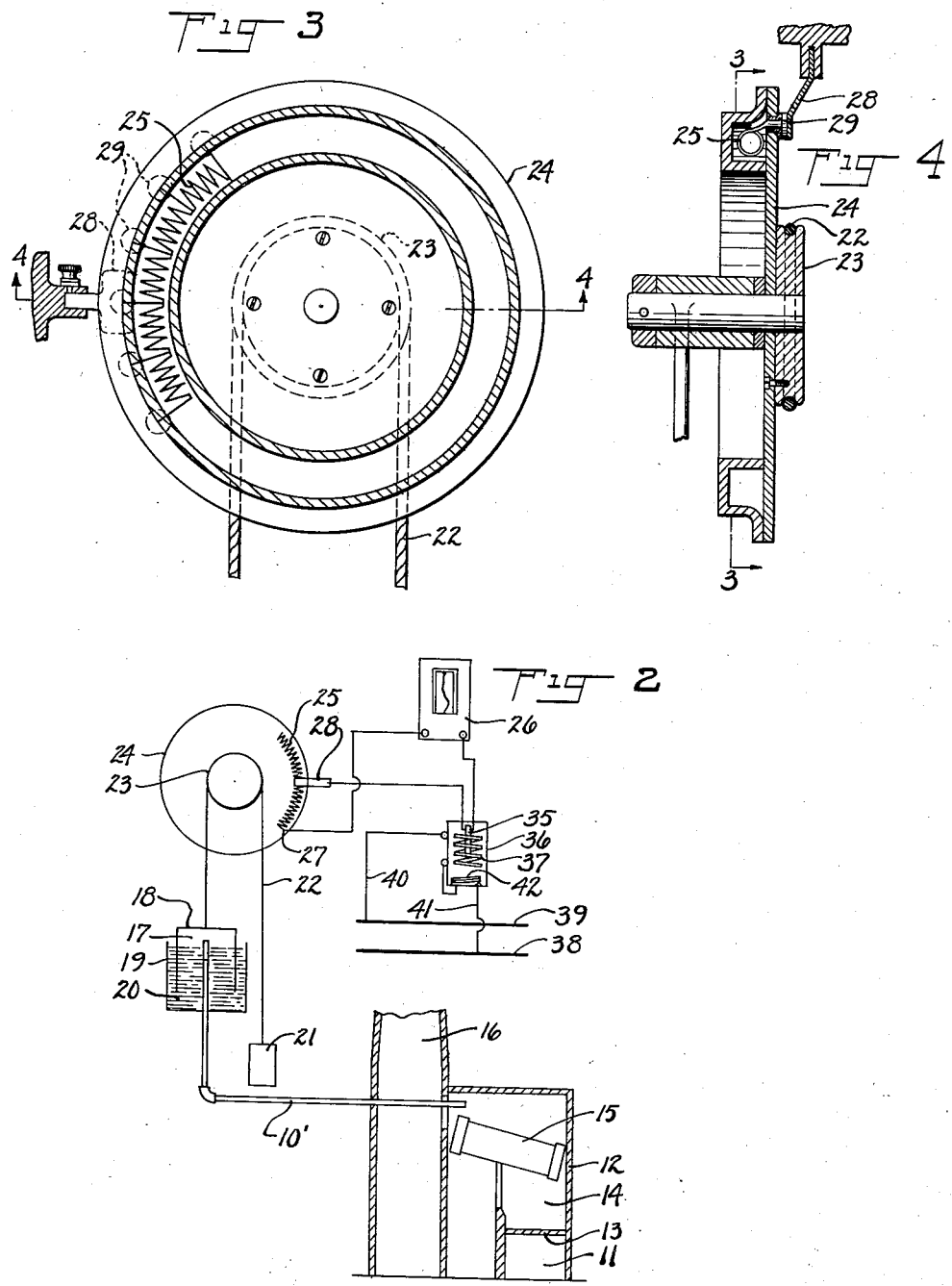
Inventors
Frederick D. Potter
Nelson Hiss
By Their Attorney
H. H. Dyke Patented June 4, 1929.

1,715,511

UNITED STATES PATENT OFFICE.

FREDERICK D. POTTER, OF LINDEN, NEW JERSEY, AND NELSON HISS, OF NEW YORK, N. Y., ASSIGNORS TO COMBUSTION CONTROL COMPANY, INC., A CORPORATION OF NEW YORK.

INDICATING OR RECORDING APPARATUS.

Application filed March 18, 1921. Serial No. 453,527.

The apparatus of the present invention has wide application, but is illustrated herein as applied to a draft gauge for a boiler furnace.

Fluid meters which are customarily made use of for draft gauges are of limited utility and must be located within piping distance of the furnace. With the device of the present invention movement of a float or other moving body is made use of to impose corresponding changes upon an otherwise substantially uniform electric current, and the indicating or recording device operated by the changes in the current can be located at any convenient point or distance as, for example, at a central control station for boiler operation, in the office of the plant superintendent, etc. The invention may also be applied in connection with $CO_2$ meters, steam flow meters and the like, or same can be made use of generally wherever an indication or record of mechanical movement is to be made at a distance.

In the drawings, Fig. 1 is a diagrammatical sectional view showing the application of my invention to a draft gauge for a boiler. Fig. 2 is a view similar to Fig. 1, but with the parts arranged for gauging the draft at another point in the furnace. Fig. 3 is a cross-sectional view of a wheel used for varying the electrical resistance in the meter circuit, and Fig. 4 is a cross-sectional view taken on the line 4—4, Fig. 3.

In the drawings, a pipe 10 is shown in Fig. 1 leading to the ash pit 11 of a boiler furnace comprising a boiler setting 12, grate 13, combustion chamber 14, boiler 15 and stack 16. The pressure in the ash pit may be either above or below atmospheric depending on whether draft is due to suction or pressure. In Fig. 2 the pipe 10′ leads to the intake of stack 16 above the boiler 15, and such pipe may be connected wherever varying pressure or suction is present, and an indication or record thereof is desired to be obtained.

The pipe leads into a chamber 17 of an open bottom float 18, which chamber 17 is in communication with the interior of the vessel 19 containing suitable liquid 20. Float 18 is counterbalanced by a weight 21. The float 18 rises and falls in accordance with variations of pressure or suction communicated by pipe 10 or 10′ in the manner common with fluid meter floats.

The movement of float 18, instead of being mechanically communicated to a pen or indicating arm, as has been the usual practice, is used in accordance with the present invention to impose changes upon an electric current. This is accomplished in the embodiment illustrated by utilizing the movement of the float 18 to vary the resistance to be traversed by an electric current. The movement of the float 18 is relatively slight, and means are preferably provided for multiplying this movement as, for example, the cord 22 connecting float 18 with counterweight 21 may be run over a pulley 23 attached to and serving to turn a wheel 24 having a diameter several times that of the pulley 23.

Resistance material 25, preferably in the form of coiled wire, is placed in the wheel 24 and same is so arranged that upon rotation of the wheel 24, due to movement of float 18, the resistance will be progressively cut in or cut out of the electric circuit, including a suitable indicating or recording instrument 26, and a substantially constant source of electrical current. In the apparatus illustrated the recording or indicating instrument 26, which may be of any of the well known types and therefore need not be specifically described, has one terminal connected at 27 to one end of the resistance element 25 and the other end to the brush 28, which is adapted to come into contact with the contact members 29 arranged along the resistance element 25 at suitable intervals.

The constant current source illustrated in the drawings comprises a thermocouple 35 in a box or furnace 36, which also contains an electric heating element 37, taking current from any suitable source, as the line 38, 39. The circuit wires 40, 41 include means such as a thermostat 42 adapted to regulate the heating of the element 37 and therefore the thermocouple 35, by shutting off the line current when the temperature tends to rise and closing said circuit when the temperature tends to fall, in a manner which will be readily understood. Any usual means may be utilized for keeping the cold junction of the thermocouple at a uniform temperature in a manner which is well understood in the art. The recording instrument and record sheet is preferably calibrated so that the record or indication secured is substantially identical with that obtained with an ordinary fluid meter.

It is to be understood that the apparatus shown herein is for illustration only and for affording an understanding of the invention and to one use which can be made of the invention, and limitations are not to be imposed upon the invention thereby.

We claim:

1. A movable rheostat, a thermocouple, a thermostatically controlled electric heating device for heating the thermocouple to a substantially constant temperature, and an electric measuring circuit including the rheostat coils, a current measuring means for measuring currents of low voltage, and the thermocouple.

2. A movable rheostat, a thermocouple and a substantially uniform temperature electrical heater therefor, current measuring means for minute electrical currents, and a circuit including the rheostat, thermocouple and measuring means.

3. In combination, a movable member, an electrical circuit including a voltmeter, a thermocouple, a resistance element mounted in said movable member and moving therewith, and a brush adapted to make variable contact with said resistance element; and a thermostatically controlled electric heater for heating the hot junction of the thermocouple to a substantially constant temperature, whereby an indication is obtained from said voltmeter of the extent of movement of said movable member.

4. In combination, a meter, a movable rheostat, a thermocouple, an electric circuit including said meter, rheostat and thermocouple, and means for supplying substantially constant heat to the hot junction of the thermocouple comprising an electric heater, a casing for the heater and junction, and a thermostatic switch associated with the heater and casing to close and open the heater circuit as the thermostatic switch controlling means contracts or expands, respectively.

In testimony that we claim the foregoing, we have signed our names hereto.

FREDERICK D. POTTER.
NELSON HISS.